March 8, 1966    C. S. WHITE    3,238,601
BEARING AND METHOD OF MAKING
Filed Feb. 24, 1964

INVENTOR.
Charles S. White
BY
Barnard, McGlynn & Reising
ATTORNEYS

United States Patent Office 3,238,601
Patented Mar. 8, 1966

3,238,601
BEARING AND METHOD OF MAKING
Charles S. White, 35826 41st St., Palmdale, Calif.
Filed Feb. 24, 1964, Ser. No. 346,754
8 Claims. (Cl. 29—149.5)

This invention relates to bearings and more particularly to an improved composite bearing element and method for manufacturing same. The invention has as one of its principal objects the provision of a bearing or bearing element which can be manufactured at relatively low cost and yet which has excellent durability and load carrying characteristics. Since the bearings can be manufactured inexpensively they find wide application in engines mechanical movements and other manufactures which for competitive reasons must be produced at relatively low cost. Also, because of the excellent durability and other characteristics, the bearings can be used to replace more expensive bearing structures currently required in more expensive items of manufacture thereby affecting a cost saving without reduction in quality.

Briefly, the present invention comprehends a bearing element comprising a backing member, preferably sheet metal, having a low friction facing layer bonded thereto, the facing layer comprising a uniform mixture of about 40% to 60% by weight organic resin, preferably phenolic resin, about 5% to 10% by weight powdered heat conductive material selected from the group consisting of graphite, the metal powders and mixtures thereof, preferably all graphite, and about 30% to 55% by weight of another finely divided material at least a portion of which is a high heat resistant reinforcing material, preferably asbestos. In the preferred bearing the surface layer includes, in addition to the phenolic resin and the graphite, about 20% to 25% by weight finely divided lubricative thermoplastic resin, ideally Teflon (polytetrafluoroethylene) flock, and about 5% to 35% by weight of the asbestos. Powdered Teflon can be used though not to equal advantage as Teflon in the form of short fibers of flock. Hence, the preferred embodiment comprises a metal or other hard backing with a surface layer bonded thereto comprising Teflon flock embedded in reinforced relatively high heat conductive phenolic resin matrix.

For optimum results the asbestos or other reinforcing material is substantially saturated with lubricating oil, ideally a high-boiling point constant viscosity oil. Further in accordance with the invention, such a bearing can be advantageously manufactured by: (1) coating a steel or other metal strip with a thin layer of thermosetting resin, preferably phenolformaldehyde; (2) preparing a uniform mixture as aforesaid using, as the resin, phenolformaldehyde dispersed or dissolved in a solvent; (3) applying a surface layer of such mixture to the resin coated surface of the steel strip; (4) drying the surface layer and curing the phenolformaldehyde in the undercoating and in the surface layer to its B stage; (5) shaping the metal strip to provide the bearing shape desired, for example, a sleeve bearing, and (6) heating the so formed bearing to cure the resin to its C stage. If desired the bearing while still hot can be immersed in lubricating oil, preferably a high boiling point constant viscosity oil. During the immersion the oil wicks into the asbestos reinforcing material whereby the asbestos becomes substantially saturated with oil. Bearings so manufactured have excellent lubricity along with excellent strength, load carrying capacity and durability.

The above and other objects, features and details of the invention will appear more clearly from the following detailed description of preferred embodiments thereof made with reference to the drawings in which.

Figure 2:
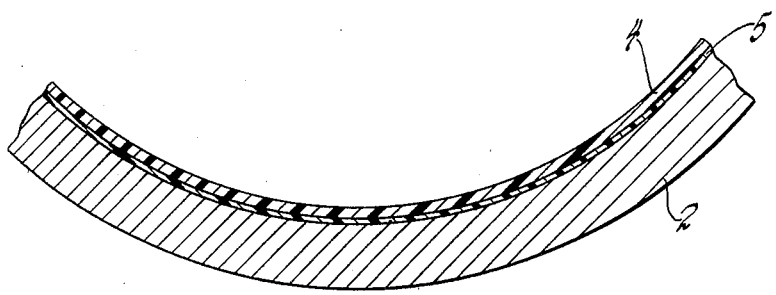
FIGURE 2 is a sectional view in enlarged scale of a portion of the bearing shown in FIGURE 1.

Referring now to the drawings, the bearing shown comprises a steel backing member 2 shaped to a cylinder, a tab 3 at one end of the strip being mated with a notch at the other end of the strip to fixedly secure the ends of the strip together. As can best be seen in FIGURE 2, the metal backing strip has a low friction surface coating 4 which is bonded to the metal backing strip through an intermediate resin layer 5, all as described above. If desired, the low friction layer can be applied and bonded directly to the metal backing strip, however, not to equal advantage.

Whereas phenolformaldehyde is much preferred as the organic resin both for the intermediate bonding layer and for the low friction layer, other resins may be used if desired. Examples are ureaformaldehyde, the alkyd resins, epoxy and the melamine resins. The thermosetting resins are much preferred over the thermoplastics not only because of their higher strength and heat resistance but also because they have less tendency to wet and fill the asbestos or other reinforcing material during mixing and molding and hence provide a bearing with better lubricating oil absorbing properties. Flake graphite is much superior as the heat conducting material though fine grain metal powders such as copper, aluminum or silver can be used if desired.

Examples of materials which can be used in place of asbestos for reinforcing the bearing are mica, Fullers earth and vermiculite. Glass fibers can also be used though not to equal advantage.

Teflon is ideal as the lubricative thermoplastic ingredient in the preferred composition not only because of its excellent lubricity but also because of its relative softness as compared with the phenolic resin matrix. In bearing operation, the Teflon from the flock exposed at the surface of the bearing can be slowly rubbed over the entire bearing surface by reason of its relative softness and yet without excessive bearing wear since the hard resin matrix with its embedded reinforcing material has exceptionally good wear characteristics. Other thermoplastics softer than the resin binder and having good inherent lubricity can be used in place of Teflon though not to equal advantage. Examples of such other thermoplastics are polytrifluoromonochloroethylene (Kel-F), nylon and the polyalkylene such as polyethylene, polypropylene and copolymers thereof. It is within the purview of the invention to additionally include within the composition small amounts up to about 10%, of other dry lubricant materials, for example, molybdenum disulfide, tungsten disulfide or boron nitride. Where such addition is made it can be at the sacrifice of the content of any of the other ingredients though for optimum results, the amounts of the other ingredients should not be below the ranges set forth above. Of course, whereas the graphite is included for its thermal properties it does, nevertheless, inherently also function as a lubricant and hence it will seldom if ever be necessary or desirable to include lubricant other than the Teflon and the graphite, within the ranges specified. As has already been mentioned, additional lubricity can, if desired, be imparted by oil impregnation.

It is important for optimum strength and durability of the surface layer and its ability to adhere strongly to the backing that the resin content not be significantly greater nor significantly less than from 40% to 60% by weight. Also, if the graphite content exceeds or is significantly less than from 5% to 10% by weight there is a diminution in useful bearing properties. At less than 5% graphite there is loss of thermal conductivity and with more than 10% there is loss in mechanical strength. The end result, in either case, is some loss in bearing durability and load carrying capacity. The preferred composition for the exposed low friction bearing layer is 60% by weight phenolformaldehyde, 5% by weight graphite, 22% by weight Teflon flock and 13% by weight asbestos.

The following will serve to illustrate the preferred method of manufacture.

Figure 1:
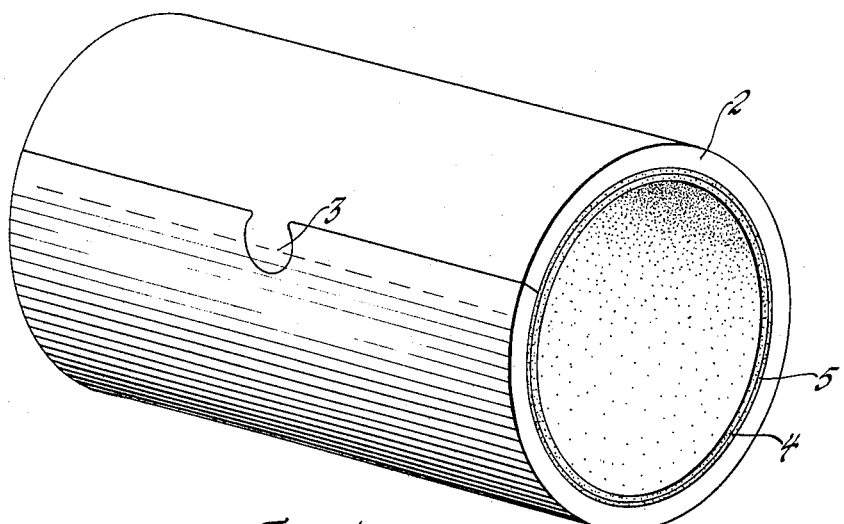
FIGURE 1 is a perspective view of a sleeve bearing embodying the invention.

A solution or dispersion of A stage phenolformaldehyde in wood alcohol (approximately 60% solids) is uniformly admixed with flake graphite, about 10 micron size, asbestos and Teflon flock in proportions to provide on a dry weight basis a composition having the aforesaid percentages of these ingredients. Preferably the phenolformaldehyde is admixed with the graphite and such mixture is allowed to stand for a period sufficient to allow the resin solution to thoroughly wet the graphite, about 24 hours being ample, after which such mixture is tumbled with the asbestos and the Teflon flock to form the final mixture which constitutes a very viscous liquid. In a separate operation a strip of sheet steel is treated first by roughening one surface thereof, as by acid etching or by abrading, and such surface is then coated with a thin layer of 60% solids A stage phenolformaldehyde solution or dispersion in a solvent such as wood alcohol. After such coating has dried, and has been cured to its B stage by the application of heat, the viscous mixture, prepared as described above, is coated over the surface of the phenolformaldehyde layer and is then dried and then cured to its B stage by the application of heat. The coated metal strip is then bent around a mandrel with the coated surface toward the inside to form a cylinder, the notch at one end of the strip being engaged at the tap at the other end of the strip, as shown in FIGURE 1. Then the shaped bearing element is heated to about 350° F. for about 10 to 15 minutes while a pressure on the order of 200 to 1000 pounds per square inch, preferably 1000 pounds per square inch, is applied to the coating. The phenolformaldehyde resin is thereby cured to its C stage. Immediately after curing and while the bearing element is still hot it can be immersed in lubricating oil, preferably constant viscosity silicone oil for up to about 1 hour. The bearing element is then ready for use. The amount of absorbed oil will generally be about 1 to 2% of the weight of the low friction coating.

Generally an outercoating thickness of about .01 inch is ample through if desired the coating can be made thicker. Since the coating can be easily machined, a thick coating can be applied, and after curing can be machined to provide extremely close tolerances. The intermediate phenolformaldehyde coating, can of course, be exertmely thin, on the order of .005 inch or less. Particularly where the combined coating thickness is greater than .01 inch the practice described above of curing the resin to its C stage after the metal strip is formed to its final desired shape is much preferred. However, where the entire coating thickness is less than .01 inch and where the bearing is not required to be shaped to complex short radius contour, the resin can be cured to its C stage prior to the shaping operation if desired. It will be understood, of course, that if for a particular bearing it is not desired to include Teflon flock, then the mix as described is modified by leaving out the Teflon and increasing the amount of asbestos. The single advantage to eliminating the Teflon is that of cost saving. Where the layer does not include Teflon, the oil impregnation step is more important and the increase in asbestos content provides increased oil absorbency to furnish the needed low friction characteristics.

The use of an intermediate resin layer is not essential but is highly advantageous. First, it better assures an optimum bond between the low friction layer and the backing. Secondly, it allows greatly increased flexibility in production and production scheduling since the resin layer serves to protect the surface of the backing against corrosion or other damage thereby allowing storage for prolonged periods without hazard of damage. For example, sheet steel, properly cleaning and roughened, can be coated with the phenolic and then as it is needed cut to the desired shapes for final coating with the low friction layer. The phenolic bonded layers have excellent adhesion, especially while in the B stage, and hence the metal backing can be shaped to relatively short radius contour without impairment to the low friction surface, curing to the C stage being accomplished after the shaping operation.

As an alternative method for the manufacture of bearings in accordance with the invention, the viscous mixture prepared as described above can be extruded or otherwise shaped into a dried strip or sheet which strip or sheet can then be pressed against and bonded to the metal backing by the application of heat, the metal backing preferably being precoated, as aforesaid, with a thin layer of the phenolic resin. After such bonding the bearing can then be shaped as desired and the resin cured to its C stage while pressure is applied to assure a dense surface shaped to the contour desired. If tolerances necessitate, the layer can then be machined. The oil impregnation treatment, if desired, can either precede or follow such machining.

It should be understood that whereas the invention has been described with reference to a cylindrical bearing, any of various other shapes can be provided. In this regard and with regard to other alternatives, reference is made to my United States patent application Serial Number 95,684 filed March 14, 1961, now abandoned of which this instant patent application is a continuation-in-part, the teachings of said previous patent application being incorporated herein by reference.

It will be understood therefore that whereas the invention has been described in detail with reference to certain preferred embodiments thereof, various changes and modifications may be made all within the full and intended scope of the claims which follow:

I claim:

1. A bearing element comprising a sheet metal backing bent to annular shape and having bonded thereto a low friction surface layer for bearing engagement with the surface of another member; said low friction surface layer comprising a uniform mixture of hardened thermosetting organic resin; a finely divided heat conductive material selected from the group consisting of carbon, copper, aluminum and silver; a finely divided heat resistant reinforcing material for said resin selected from the group consisting of asbestos, mica, fuller's earth, vermiculite and glass fibers; and finely divided polytetrafluoroethylene.

2. A bearing element as set forth in claim 1 wherein said resin is phenolic resin, said heat conductive material is graphite and said reinforcing material is asbestos.

3. A bearing element as set forth in claim 1 wherein said polytetrafluoroethylene is in the form of flock.

4. A bearing element comprising a sheet metal backing bent to annular shape and having a low friction coating on the inner surface thereof for bearing engagement with the surface of another member; said low friction coating comprising about 40% to 60% by weight thermosetting organic resin, about 5% to 10% by weight finely divided heat conductive material selected from the group consisting of carbon, copper, aluminum and silver, and about 30% to 55% by weight of other finely divided material a portion of which is a heat resistant reinforcing material for said resin selected from the group consisting of asbestos, mica, fuller's earth, vermiculite and fiber glass and another portion of which other finely divided material is polytetrafluoroethylene.

5. A bearing element comprising a thin metal backing strip bent to annular shape and having a low friction coating on the inner surface thereof for bearing engagement with the surface of another member; said low friction coating comprising a uniform mixture of about 40% to 60% by weight thermosetting organic resin; about 5% to 10% by weight finely divided heat conductive material selected from the group consisting of carbon, copper, aluminum and silver; about 5% to 35% by weight finely divided heat resistant reinforcing material for said resin selected from the group consisting of asbestos, mica, fuller's earth, vermiculite and fiber glass; and about 20% to 25% by weight polytetrafluoroethylene flock.

6. A bearing element as set forth in claim 5 wherein said resin is phenolic resin, said heat conductive material is graphite and said reinforcing material is asbestos.

7. A method for manufacturing a bearing element comprising the steps of coating a surface of a sheet metal member with a mixture of thermosetting organic resin, finely divided polytetrafluoroethylene, finely divided heat conductive material selected from the group consisting of carbon, copper, aluminum and silver, and finely divided heat resistant reinforcing material for said resin selected from the group consisting of asbestos, mica, fuller's earth, vermiculite and glass fibers; bending said coated metal member to arcuate shape; and then heating said coated metal member to cure said thermosetting resin.

8. A method for manufacturing a bearing element comprising the steps of coating a surface of a sheet metal member with a mixture of thermosetting organic resin, finely divided heat conductive material selected from the group consisting of carbon, copper, aluminum and silver and finely divided heat resistant reinforcing material for said resin selected from the group consisting of asbestos, mica, fuller's earth, vermiculite and glass fibers; bending said coated metal member to arcuate shape; heating the bent coated metal member to cure said thermosetting resin; and contacting the bent coated metal member with lubricating oil while said coated metal member is still hot after curing of said thermosetting resin.

References Cited by the Examiner
UNITED STATES PATENTS

| | | | |
|---|---|---|---|
| 2,400,091 | 5/1946 | Alfthan | 252—12.2 X |
| 2,553,215 | 5/1951 | Schultz | 161—205 X |
| 2,581,926 | 1/1952 | Groten et al. | 161—205 |
| 2,600,321 | 6/1952 | Pyle | 252—12.2 X |
| 2,838,436 | 6/1958 | Clingman | 156—93 |
| 2,964,476 | 12/1960 | Coad. | |
| 3,089,198 | 5/1963 | Eirhart | 29—149.5 |

EARL M. BERGERT, *Primary Examiner.*

MORRIS SUSSMAN, ALEXANDER WYMAN,
*Examiners.*